United States Patent
Florio (10) Patent No.: US 11,763,278 B2
(45) Date of Patent: Sep. 19, 2023

(54) DEPOSIT TOKEN SERVICE SYSTEM, APPARATUS AND METHOD

(71) Applicant: Bottomline Technologies (de) Inc., Portsmouth, NH (US)

(72) Inventor: Jamie Florio, Rochester, NH (US)

(73) Assignee: Bottomline Technologies, Inc., Portsmouth, NH (US)

( * ) Notice: Subject to any disclaimer, the term of this patent is extended or adjusted under 35 U.S.C. 154(b) by 139 days.

(21) Appl. No.: 16/818,015

(22) Filed: Mar. 13, 2020

(65) Prior Publication Data
US 2021/0287191 A1 Sep. 16, 2021

(51) Int. Cl.
*G06Q 20/10* (2012.01)
*G06Q 20/36* (2012.01)

(52) U.S. Cl.
CPC ......... *G06Q 20/108* (2013.01); *G06Q 20/363* (2013.01); *G06Q 20/3674* (2013.01); *G06Q 20/3678* (2013.01)

(58) Field of Classification Search
None
See application file for complete search history.

(56) References Cited

U.S. PATENT DOCUMENTS

| | | | |
|---|---|---|---|
| 5,600,735 A | 2/1997 | Seybold | |
| 5,600,835 A | 2/1997 | Garland et al. | |
| 5,845,369 A | 12/1998 | Dunchock | |
| 6,801,190 B1 | 10/2004 | Robinson et al. | |
| 6,845,369 B1 | 1/2005 | Rodenburg | |
| 7,716,129 B1 * | 5/2010 | Tan | G06Q 20/32 705/40 |
| 8,401,867 B2 | 3/2013 | Lagadec et al. | |
| 8,881,005 B2 | 11/2014 | Al et al. | |
| 9,015,036 B2 | 4/2015 | Karov et al. | |
| 9,165,291 B1 * | 10/2015 | Andersen | G06Q 20/10 |
| D764,495 S | 8/2016 | Cartlidge | |
| 9,449,346 B1 | 9/2016 | Hockey et al. | |
| D776,131 S | 1/2017 | Cartlidge | |
| 9,595,023 B1 | 3/2017 | Hockey et al. | |
| 9,798,984 B2 | 10/2017 | Paleja et al. | |
| D803,233 S | 11/2017 | Wilberding | |

(Continued)

FOREIGN PATENT DOCUMENTS

| | | |
|---|---|---|
| EP | 2653982 A1 | 10/2013 |
| EP | 2636149 A4 | 10/2016 |

(Continued)

OTHER PUBLICATIONS

Appaloosa Store, "Siring Similarity Algorithms Compared", Apr. 5, 2018, webpage downloaded on Oct. 20, 2020 rom https://medium.com/@appaloosastore/string-similarity-algorithms-compared-3f7b4d12f0ff.

(Continued)

*Primary Examiner* — Chrystina E Zelaskiewicz
(74) *Attorney, Agent, or Firm* — Richard A. Baker, Jr.

(57) ABSTRACT

A system, method and apparatus for providing a global service for securely storing deposit instructions is described. The service provides payment processing services with a central location to translate payee information into a revocable d-token that represents the payee deposit instructions. A second service allows qualified banking institutions to convert the d-token into deposit instructions to effectuate a funds transfer.

15 Claims, 5 Drawing Sheets

(56) References Cited

U.S. PATENT DOCUMENTS

| | | | |
|---|---|---|---|
| 9,928,490 B1* | 3/2018 | Vancini | G06Q 40/02 |
| 10,235,356 B2 | 3/2019 | Amend et al. | |
| 10,319,029 B1 | 6/2019 | Hockey et al. | |
| 10,410,190 B1* | 9/2019 | Kapoor | G06Q 20/40 |
| D872,737 S | 1/2020 | Ressel et al. | |
| 10,699,075 B2 | 6/2020 | Amend et al. | |
| 10,824,809 B2 | 11/2020 | Kutsch et al. | |
| 10,909,511 B2 | 2/2021 | Chanyontpatanakul | |
| 10,929,851 B2 | 2/2021 | Kang et al. | |
| 11,068,866 B1* | 7/2021 | Hecht | G06Q 20/385 |
| 2006/0149641 A1* | 7/2006 | Loeb | G06Q 30/0635 |
| | | | 705/26.81 |
| 2009/0174667 A1 | 7/2009 | Kocienda et al. | |
| 2011/0137789 A1* | 6/2011 | Kortina | G06Q 40/025 |
| | | | 705/38 |
| 2013/0254115 A1 | 9/2013 | Pasa et al. | |
| 2015/0039473 A1 | 2/2015 | Hu et al. | |
| 2015/0220509 A1 | 8/2015 | Karov Zangvil et al. | |
| 2015/0278773 A1* | 10/2015 | Rolf | G06Q 40/03 |
| | | | 705/40 |
| 2016/0041984 A1 | 2/2016 | Kaneda et al. | |
| 2017/0039219 A1 | 2/2017 | Acharya et al. | |
| 2017/0068954 A1 | 3/2017 | Hockey et al. | |
| 2017/0070500 A1* | 3/2017 | Hockey | H04L 9/3228 |
| 2018/0053157 A1* | 2/2018 | Roffey | G06K 19/06206 |
| 2019/0014101 A1 | 1/2019 | Hockey et al. | |
| 2019/0182233 A1 | 6/2019 | Hockey et al. | |
| 2019/0213587 A1* | 7/2019 | Chen | H04L 63/0428 |
| 2019/0318122 A1 | 10/2019 | Hockey et al. | |
| 2019/0340590 A1* | 11/2019 | Davey | G06Q 20/02 |
| 2020/0250664 A1* | 8/2020 | Kumar | G06Q 20/3674 |
| 2021/0049326 A1 | 2/2021 | Amend et al. | |

FOREIGN PATENT DOCUMENTS

| | | |
|---|---|---|
| KR | 10-0723738 B1 | 5/2007 |
| WO | 2012/061701 A1 | 5/2012 |
| WO | 2017/209799 A1 | 12/2017 |

OTHER PUBLICATIONS

International Search Report and Written Opinion received for PCT Patent Application No. PCT/US17/13148, dated May 19, 2017, 11 pages.

Oracle(Registered)Warehouse Builder Data Modeling, ETL, and Data Quality Guide, Chapter 23, 11g Release 2 (11.2), Part No. E10935-04, Aug. 2011, web page downloaded from https://docs.oracle.com/cd/E24693_01/owb.11203/e10935/match_merge.htm on Apr. 16, 2020.

Vogler, Raffael, "Comparison of Siring Distance Algorithms", Aug. 21, 2013, webpage downloaded on Oct. 20, 2020 from https://www.joyofdala.de/blog/comparison-of-string-distance-algorithms.

Wikipedia, "Damerau-Levenshtein distance", webpage downloaded on Oct. 20, 2020 from https://en.wikipedia.org/wiki/Damerau-Levenshtein_distance.

"EMV Payment Tokenisation, A Guide to Use Cases", EMVCo, LLC, Version 1.0, Jun. 2019.

"EMV Payment Tokenisation Specification, Technical Framework", EMVCo, LLC, Version 2.1, Jun. 2019.

* cited by examiner

DEPOSIT TOKEN SERVICE SYSTEM, APPARATUS AND METHOD

PRIOR APPLICATION

This application is a priority application.

BACKGROUND

Technical Field

The system, apparatuses and methods described herein generally relate to electronic payments, and, in particular, to improvements in payment deposits.

Description of the Related Art

With the rapid digitization of the economy, many replacements for the use of paper-based exchanges of money have emerged. These include methods to reduce the use of cash and checks at the point of sale, person to person payments and business payments. This has included consumer point of sale systems, mobile wallets, mobile payment systems and business payment networks.

Each of these include an intermediate step for the financial transaction. This intermediary facilitates the final payment by either directly settling the transaction by collecting and then distributing the funds (clearing), or maintaining the information on the funds origination and destination and facilitating the direct money movement. Many of these platforms, such as credit cards, debits cards, Venmo, PayPal, Walmart Pay, Apple Pay, Google Pay, Cash App, Zelle, etc, leverage identity tokenization as a reference for each of the participants in the financial transaction. This allows payer and payees alike to benefits from the increased efficiency, but without sacrificing privacy of their information or security of the financial transaction(s). This token allows each of the participants to link their specific information and preferences with the payment service, type or "rail" (schemes) chose for settlement.

However, as the market become increasing more mature, it also becomes increasingly more fractured. People and business have more and more choice for digital payments. To fully participate in all of the digital payment options, many people and business have joined multiple payment schemes. Additionally, at any given point, there are inherent, intrinsic or immediate benefits and drawbacks to using one scheme over another. This has led to the challenge of acquiring, storing and knowing the payer and/or payee choice on for a financial transaction. A particular participant may have enrolled in some, none or all available schemes or may have distinct preferences or requirements for leverages particular schemes.

However, the number of platforms has created a problem with use. The payee needs to be registered with each service to receive a payment, exposing his bank account information to a number of platforms. Each time the consumer wants to receive payment from a different platform, the platform sends the payee a form to fill out with payment preferences and bank information. There is an important need to improve the way that bank information is collected and stored in the mobile payments industry. There is a need to improve by storing the account information in a single secure location, and for the information to be entered once, or not to be entered at all. The present invention addresses these issues.

BRIEF SUMMARY OF THE INVENTION

An apparatus for processing electronic deposit information is described herein, the apparatus is made up of a datastore containing a database of records containing user identifiable information and payment instructions, each record labeled with one or more tokens, where each of the one or more tokens point to the record. The apparatus also includes a plurality of processing cores electrically connected to the datastore, and one or more network interfaces, electrically connected to the plurality of processing cores and to a banking rail and to an internet. The plurality of processing cores are programmed to accept a deposit request containing payee information over the internet, search the datastore for the record associated with the payee information, and return the token associated with that record to the internet as a d-token. The plurality of processing cores are programmed to accept the d-token from the banking rail, validate the d-token, use the d-token to select the record associated with the d-token, and return the payment instructions in the record associated with the d-token to the banking rail.

The payment instructions contain a bank account number in some embodiments and contain a credit card number in other embodiments. The user identifiable information could contain a phone number or could contain an email address. In some embodiments, the d-token contains both an identifier for the apparatus for processing the electronic deposit information and a number associated with the record. In some cases, the d-token is encrypted.

An improved method for electronically depositing payments is also described here. The method is made up of the steps of (1) receiving payee information from a payment service over a network through a network interface, (2) searching a database, the database stored in a datastore, the database of records containing user identifiable information and payment instructions, using a plurality of processing cores electrically connected to the datastore and the network interface, (3) if a matching record is found in the database, creating a d-token for the record wherein the d-token indicates the matching record, (4) returning the d-token to the payment service over the network using the network interface, (5) receiving the d-token from a financial institution over a banking rail through a rail interface, (6) validating the d-token using the plurality of processing cores, (7) locating the matching record using the d-token in the datastore using the plurality of processing cores, (8) extracting the payment instructions from the matching record in the datastore, and (9) returning the payment instructions the financial institution over the banking rail through the rail interface.

The validating step could include comparing a time difference between a d-token creation time and a d-token use time with a predetermined value, and/or comparing a number of times the d-token has been used with a predetermined value. If the matching record is not found, the method could also include the step of sending an email or a text message through the network interface to the network requesting the payment instructions. In some embodiments, the d-token and/or the payment information are encrypted.

An improved system for processing electronic deposits is also described herein. The system is made up of three components, a payment server computing device, a deposit information vault and a financial institution, connected by various networks. The payment server computing device is connected to a network. The payment server computing device is programmed to send payee information to a deposit information vault to retrieve a d-token. The payment server computing device is programmed to send the d-token to the financial institution to effectuate a payment.

The deposit information vault is made up of a datastore containing a database of records containing user identifiable information and payment instructions, each record labeled with one or more tokens, where each of the one or more tokens point to the record. The deposit information vault includes a plurality of processing cores electrically connected to the datastore, and one or more network interfaces, electrically connected to the plurality of processing cores, to a banking rail, and to an internet. The plurality of processing cores are programmed to accept a deposit request containing the payee information over the internet, search the datastore for the record associated with the payee information, and return the token associated with that record to the internet as the d-token. The plurality of processing cores are programmed to accept the d-token from the banking rail, validate the d-token, use the d-token to select the record associated with the d-token, and return the payment instructions in the record associated with the d-token to the banking rail.

The financial institution contains computing resources programmed to accept the d-token from the payment server computing device, send the d-token over the banking rail to the deposit information vault, and accept the payment instructions from the deposit information vault, then use the payment instructions to transfer funds using the payment instructions.

The payment server could run a software program to process a mobile payment. In some embodiments, the financial institution is a bank or a credit card processor. The payment instructions could include a financial institution account number. If the record associated with the payee information is not found, the system could send an email through the network interface to the network requesting the payment instructions.

DETAILED DESCRIPTION

A lookup service and directory of payment scheme tokens. This directory would link a commonly known, semi-public piece of information, with the plurality of secure payment scheme tokens, banking information and information driven digital delivery processes required for payment settlement and reconciliation across multiple possible schemes. This service will be universal, spanning all potential payment schemes, rails, clearing systems, allowing interactive and programmatic methods for answering the following:

Is "x" a participant in "y" scheme?
Is "y" a token associated with "x" based on based on "z"?
What is the identity token of "x" in "y" scheme based on "z"?
Where:
x=A business or person identifiable by a semi-public piece of information such as name and address, phone number, cell phone number, email address, MAC address of a computing device, a GPS location (for brick and motor stores and the like, where the intent is to pay the person or entity at a specific location), a social security number, a passport number, a driver's license number, a license plate number, a Facebook account, a Google account, an Apple account, a fingerprint, a retina scan, a facial scan, or other biometrics or other forms of identification.
y=A payment scheme, settlement network or clearing system that employs an (account) number or token identity for its participants
z=A piece of information in addition to the semi-public piece of information (such as cell phone, email address or legal entity\name) that can be positively associated with the participant.

"x" information is obtained through public information databases, existing specific validation and directory services and a self-help miniatous portal for participants. Through this self-help maintenance portal, participants can set their preferences for:

Participating payment schemes, settlement networks and clearing systems
Hierarch preference of payment schemes, settlement networks and clearing systems
Hierarch preference of payment remittance and reconciliation information
Security enhancement information to facilitate additional factor authentication and identification.

In order to make the deposit of mobile payments simple to use and secure, a deposit token service 102 is inserted into the payment system. This deposit token service 102 converts a readily available consumer identifier, such as a phone number, a cell phone, or a phone QR code and returns a d-token that can be used to specify a destination for the funds, such as a bank account number. The d-token can specify the ACH routing information such as the bank code and the bank account number. The d-token could also specify the SWIFT information for a wire transfer, or credit card information to allow putting funds onto a credit card. The d-token is a token, and does not have any account information encoded into it, so that there is no risk of decryption of the information. Instead, the token is a revocable index into a database. It is revocable, because after the d-token is sent out, if there is a risk that the d-token will be misused, such as with the theft of a mobile device, the record in the database that the d-token points to can be deleted or moved to a different index. This also allows for the expiration of d-tokens that are not immediately used.

The payee identifiable information could be any number of ways to identify a person, such as name and address, phone number, cell phone number, email address, MAC address of a computing device, a GPS location (for brick and motor stores and the like, where the intent is to pay the person or entity at a specific location), a social security number, a passport number, a driver's license number, a license plate number, a Facebook account, a Google account, an Apple account, a fingerprint, a retina scan, a facial scan, or other biometrics or other forms of identification.

Figure 1:
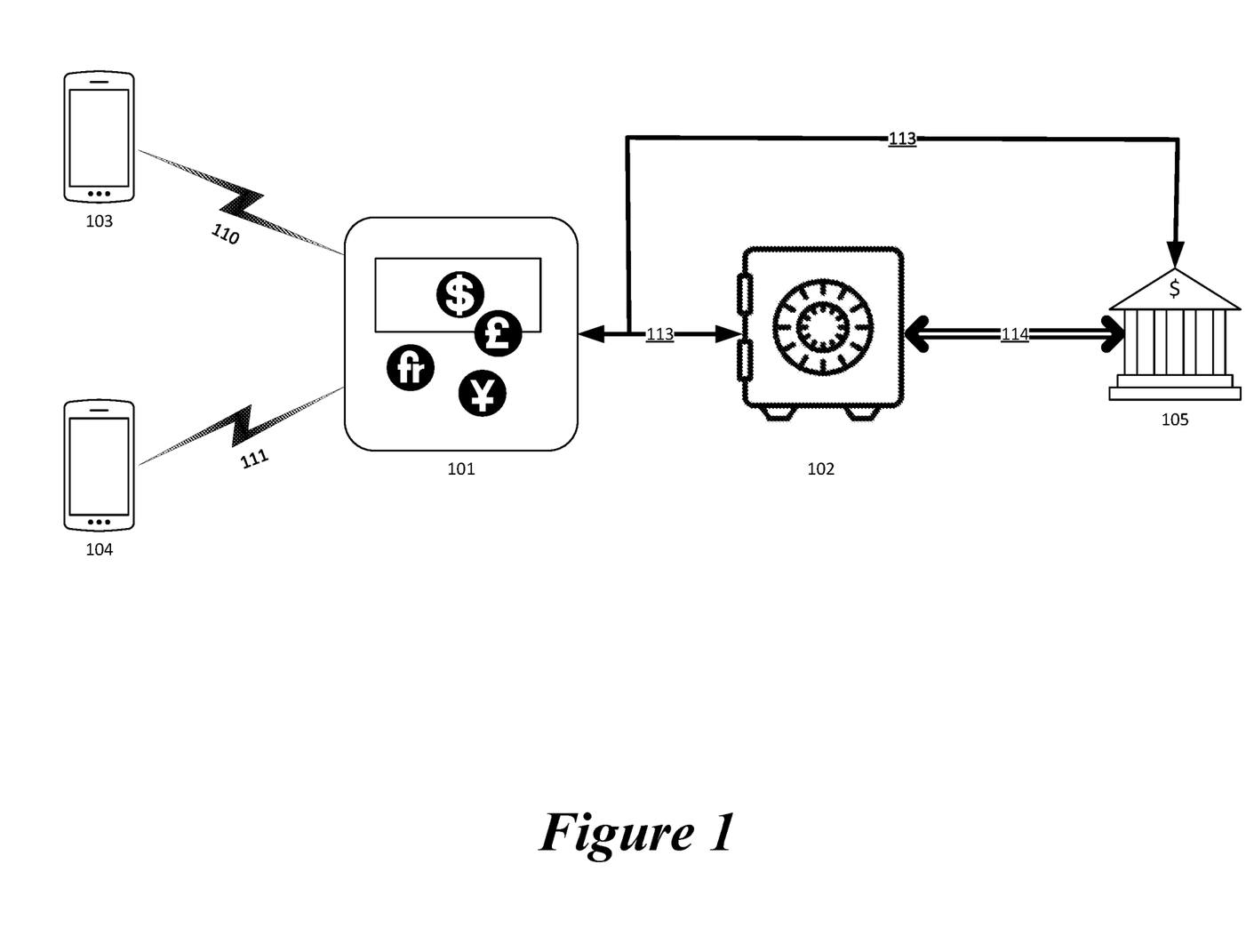
FIG. 1 shows advertisement diagram of the system for making a mobile payment using the deposit token service.

Looking to FIG. 1, the payee uses a mobile app on a smart phone 103 to initiate a payment. Note that the smart phone 103 could be substituted with a personal computer, laptop, notebook, tablet, ipod, ipad, smartwatch, cell phone, IOT device, or any other computing device. The smart phone 103 runs an app or a software program to initiate a payment. This software could be from Venmo, PayPal, Walmart Pay, Apple Pay, Google Pay, Cash App, Zelle or other mobile payment software. The smart phone 103 communicates over a network 110 such as a cellular network, a wireless network (WiFi, Bluetooth, etc), or a hardwired network (Ethernet, serial, etc). The network 110 could be the Internet (the "cloud"). The network 110 could be the same network as 111 and 113, or the networks could be different. The smart phone 103 communicates through the network 110 to the payments server 101.

The payment server 101 could be a set of one or more computing devices and storage facilities connected to the network 110. The payment server 101 runs the backend software to process the Venmo, PayPal, Walmart Pay, Apple Pay, Google Pay, Cash App, Zelle or other mobile payments. The payment server 101 takes the payee information and determines where the money for the payment is to be taken from. This could be a lookup in the payment server's 101 database of payees. In other cases, the payment information is sent to a token service provider to tokenize the payment information. In this case, the payment information is converted into a token. See the *EMV Payment Tokenisation Specification* (EMVCo, LLC, 2014-2019), and *EMV Payment Tokenisation A Guide to Use Cases* (EMVCo, LLC, June 2019, both incorporated herein by reference. The token is used to identify where the payment is to come from, typically a credit or debit card, but could also specify a bank account or an internal account number.

Traditionally, the payment goes either to a specific merchant associated with the transaction, and the payment server 101 simply accumulates the payment amounts for eventual credit to the merchant. When the payment server 101 is paying a consumer, the consumer is prompted to enter their bank account information on their smart phone 104 over a network 111, and an ACH payment is set up to effectuate the transfer.

In the present inventions, the payment server 101 is improved by using payee identifying information, as described above, sent to a deposit token service provider 102, who will return a deposit token ("d-token") that references the destination where the money is to go. This d-token is then used to send a cash transfer request over the network 113 to a financial institution 105 to transfer the funds from the token specified account to the d-token specified account. In some embodiments, the payment server 101 will first search its own database for where to make the deposit (in some embodiments, the database holds the actual financial information and in other embodiments the database only stores d-tokens), and only if the payee cannot be found in the payment server databases will the deposit token service provider 102 be queried for a d-token. In other embodiments, the deposit token service provider 102 is always queried.

The financial institution 105 could be a bank, a credit card company, a financial clearing house, a credit union, an investment firm or a similar financial institution. The financial institution 105 includes a computer and a data storage device to process fund transfer requests. The financial institution computer also include a network interface for accessing the banking rail 115 and the network 113. The network 113 could be such as a cellular network, a wireless network (WiFi, Bluetooth, etc), or a hardwired network (Ethernet, serial, etc). The network 113 could be the Internet (the "cloud"). In the preferred embodiment, the network 113 uses an assured delivery or confirmed delivery protocol and offers security to prevent changes to the data during transmission. IN some embodiments, the network 113 is the same network as networks 110 and 111.

The deposit token service provider 102 is a special purpose computing device with high security and high performance. In order to support a large number of deposit token assignments per minute, the hardware components need a design that will perform rapid replies to the request from the network 113. The deposit token service provider 102 is also considered a data vault, as it stores the mapping of d-tokens and payee information to highly sensitive bank account information. The deposit token service provider 102 manages a database of information about the payee, such as one or more of name, address, phone number, cell phone number, email address, MAC address of a computing device, a GPS location (for brick and motor stores and the like), a social security number, a passport number, a driver's license number, a license plate number, a Facebook account, a Google account, an Apple account, a fingerprint, a retina scan, a facial scan, or other biometrics or other forms of identification. In addition the database has information related to where the funds are to go, such as a financial institution account number (bank routing and account numbers), a credit or debit card number, a loan number, a mortgage number, a billing account number, PayPal account number, etc. In one embodiment, all of these fields are included in the database, and a search on any field is permitted. The database has a set of d-tokens associated with each record. The database also includes the date and time when the record is created, and the source where the payment instructions came from. Should a search of the database return multiple entries for a payee, some embodiments will return the most recent information and other embodiments will return d-tokens and an indication of all of the matching records. For instance, the list of matching records may return "Bank of America savings", "CitiBank credit card", "Santander checking" so that the payment server 101 can ask the user which to use. In another embodiment, the deposit token service 102 can ask the payee directly, either through an email, a text, or a popup screen.

The database is populated in several ways. If a record cannot be found when the database is queried, the deposit token service provider 102 prompts the user for their information. This is done by sending a text if the phone number is used for the search, or with an email if an email address is used. The text/email will ask the payee for a destination of the money, and an account designation of that destination. For instance, the payee could specify a bank routing number and a bank account, or a credit/debit card number to place the funds on, or a PayPal account to route the money to.

Another way that the database is populated is by querying other payment servers or deposit token service providers to see if they can match the payee information. If so, that information is used to load the database in some embodiments. In another embodiment, all of the records of all deposit token service providers are shared on entry with the other deposit token service providers, so that each deposit token service provider has a complete database. In some embodiments, this transfer only occurs over secure banking rails. In some embodiments, the transferred data is encrypted before transfer.

In still a third way to populate the database is to add a query in the financial institution's 105 account opening process to ask the user if they would like to register the new account for receiving payments in the deposit token service provider's 102 database. The financial institution 105 could also provide a way to register with their online software. In either case, the financial institution, using a banking rail 114 to assure secure transmission of the data, will send the information to the deposit token service provider 102.

In a fourth embodiment, the deposit token service provider 102 requests records from other deposit token service providers, creating and replicating a global deposit token service that is accessible across a region or across the world. This is similar to the DNS databases for converting URLs to IP addresses in the internet world. In some embodiments, the payee account information is kept in a single secure location, and the payee information is replicated with information on where to find the actual account information.

In some embodiments, the deposit token service provider 102 will verify the account information with the financial institution when a record is created in the database, using the banking rail 114. This verification could be in the form of a small deposit, or aa query to the financial institution.

The banking rail 114 is a secure communications channel between financial institutions, such as a direct wire, a local area network, a wide area network, or the internet, using network security techniques to prevent third parties from viewing or modifying the data on the banking rail 114. In some embodiments, the banking rail 114 is the same network as in 110, 111, and/or 113.

Figure 2:
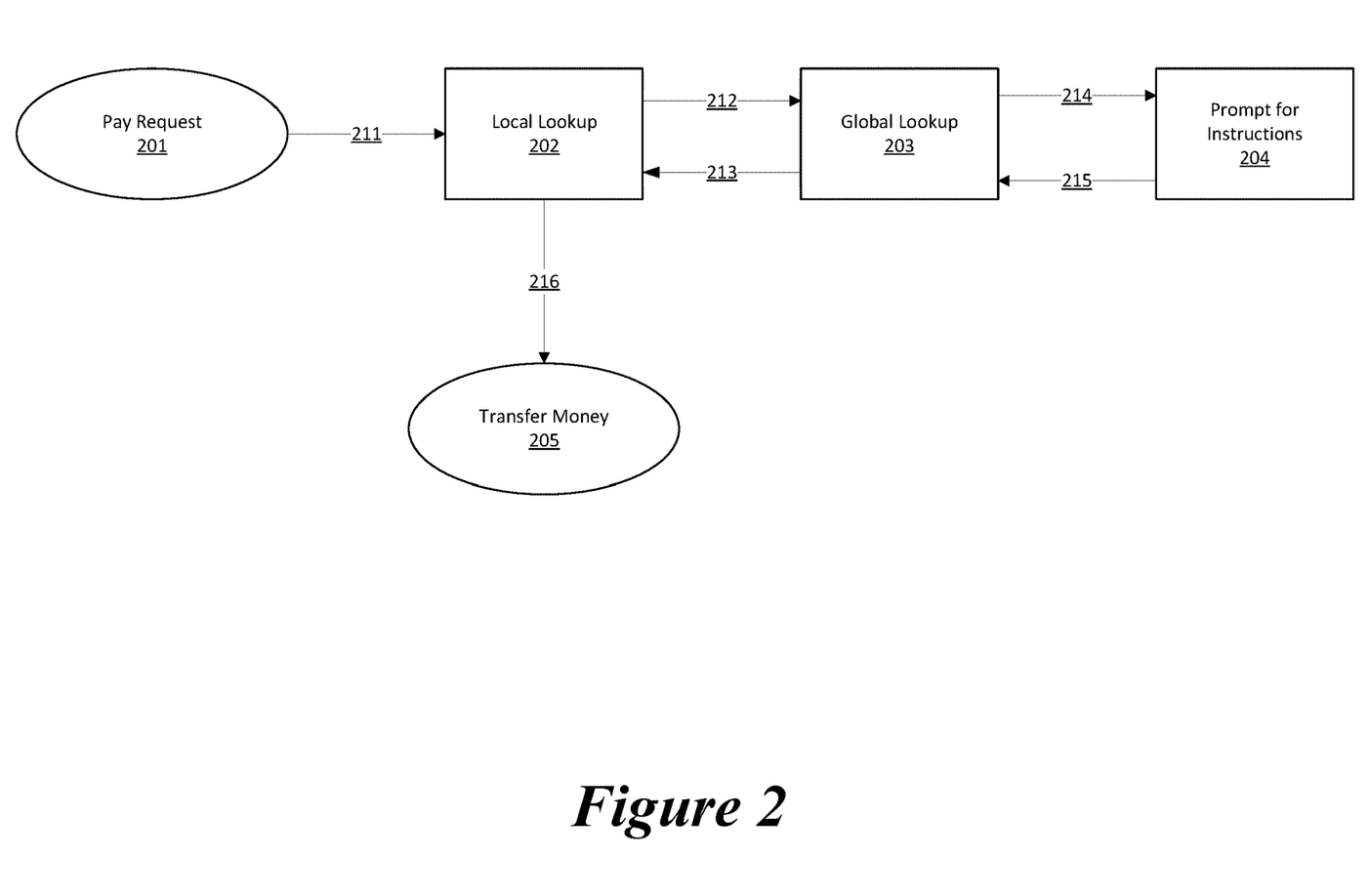
FIG. 2 shows a block diagram of the flow of information through the deposit token service.

Looking to FIG. 2, a payer initiates a payment request 201 that is sent 211 from the payer's smart phone 103 over a network 110 to the payment server 101. The payment request 201 contains an amount to pay, the payer's information, and some indication of the identity of the payee. This payee identification could be an email address or a phone number or any number of other forms of identification. The payment server 101, in addition to other tasks, performs a lookup on the payee information to see if the information is stored locally in the payment server's 101 databases. If the information is found, payee destination information is combined with the payer information and the amount to form a payment instruction that is sent 216 to a financial institution 105 to transfer the funds 205.

If the local lookup 202 fails, the payee information is sent 212 from the payment service 101 to the deposit token service provider 102 to do a global lookup 203. If the global lookup 203 finds one or more records corresponding to the payee information, the d-token for those records are returned 213 to the deposit token service provider 102. In some embodiments, the d-record of only the most recent record is returned 213. In some embodiments, the search is a linear search through all records. In some embodiments, the linear search starts with the most recent records and stops when a matching record is found. In other embodiments, hashing is used to speed up the search procedure. Other searching techniques could also be used, although an exact match (or near exact match) should be required to prevent funds deposited in the wrong account. If the payee information includes multiple fields, for instance a phone number and an email address, both should match before returning a d-token for the record. In one embodiment, each request to the deposit token service provider 102 returns a unique d-token. The d-token is given an expiration time, perhaps a week, upon which it can no longer be used. In one embodiment, once the d-token is used once, it is invalidated or deleted from the database, so that it cannot be used for multiple transfers. In another embodiment, the d-token request 212 contains a multiple use field that returns a d-token that can be reused, for instance, for recurring payments or for local storage in the payment server 101.

If the payee record cannot be found, a message is send 214 prompting the payee for payment instructions 204. This prompt could be in the form of an email message if the payee information includes an email. Or it could be in the form of a text message if the payee information contains a cell phone number. Or it could be a phone call if the payee information has a phone number. With a device identifier such as a MAC address or an IP address, a snipet of code could be sent to the device requesting the payment instructions.

If the payee cannot be contacted or does not respond to the request for information within a fixed time period, perhaps a week or so, the request will fail, and an error message is sent 215 back to the deposit token service provider 102. The deposit token service provider 102 will then send 213 an error message back to the payment service 101 to find a way to resolve the error.

Once the payee returns the payment information, it is sent 215 back to the deposit token service provider 102 for storage in the database. The deposit token service provider 102 then returns 213 the d-token to the payment service 202.

Once the payment service 101 receives 213 the d-token for the payment, the d-token is combined with the payer information and the amount to form a payment instruction that is sent 216 to a financial institution 105 to transfer the funds 205.

Figure 3:
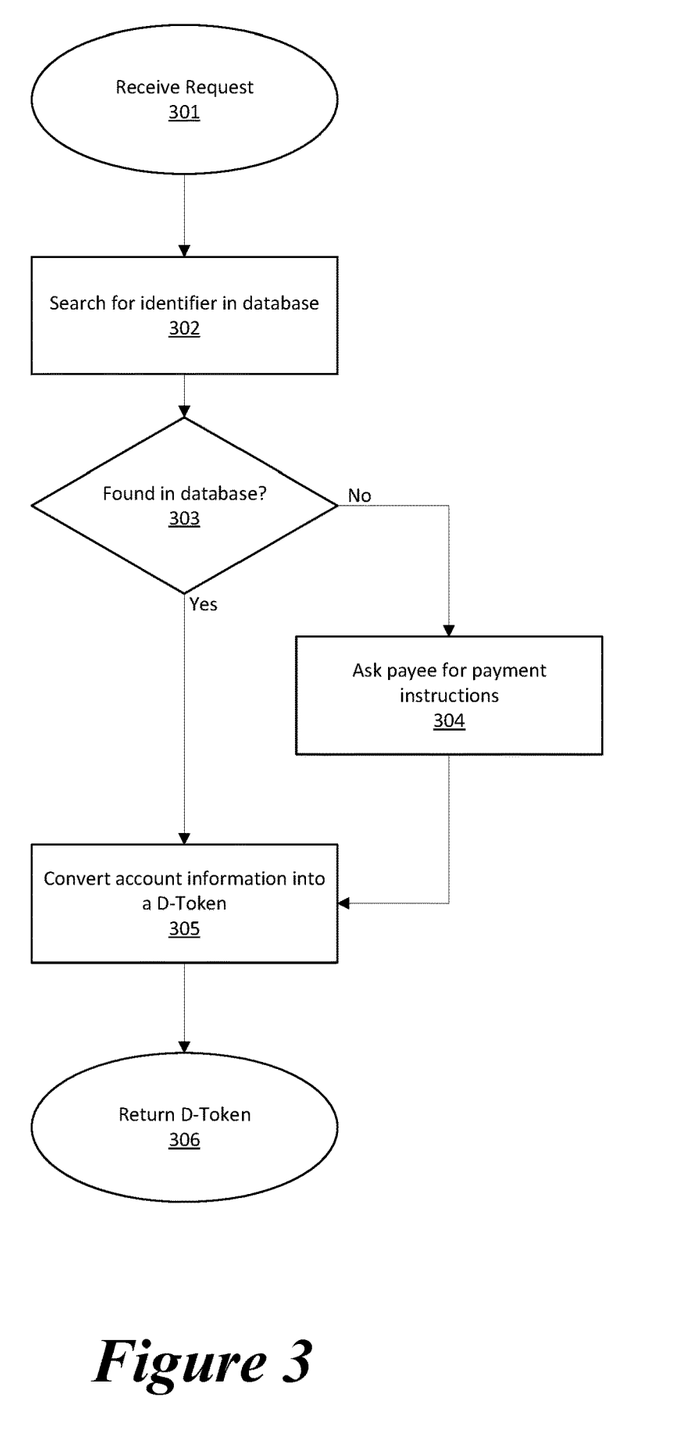
FIG. 3 is a flow chart of the deposit token service methodology.

FIG. 3 shows a flow chart of the deposit token service provider 102 actions when a request is received. The deposit token service provider 102 receives a request 301 for a d-token. This request typically comes from a payment service 101, although in some cases the request may come directly from a payment app or software in possession of the end user 103. In still other embodiments, a bank 105 could request a d-token to provide funding, in order to easily allow a customer to pay an entity that is not known to the bank or its customer. The request will contain payee information such as one or more of name, address, phone number, cell phone number, email address, MAC address of a computing device, a GPS location (for brick and motor stores and the like), zip code+4, a social security number, a passport number, a driver's license number, a license plate number, a Facebook account, a Google account, an Apple account, a fingerprint, a retina scan, a facial scan, or other biometrics or other forms of identification. The request may also include parameters specifying whether the most recent match is returned or if all matches are to be returned. A third parameter may specify whether the returned d-token is a single use token, a limited number of use token, or a perpetual token, perhaps by specifying 0 for a perpetual use token or a number specifying the number of times the token can be used. In some embodiments, the requestor is validated to assure that the requestor has permission to request a d-token. This validation could also include a check that the requestor has paid for a subscription or to count the number of requests that the requestors has made for billing purposes.

The deposit token service provider 102 then searches its databases 302 using the payee information as a key into the database. Alternatively, a linear search could be used to find the records in the database corresponding to the payee information. The linear search either terminates with the first match, or continues until all matches are found. In another embodiment, a hash of the payee information is used to find the records that match. In some embodiments, only exact matches are identified.

Next, the results of the search are checked 303 to see if any the payee was found in the database. This is a simple comparison to see if the search returned a null set.

If the search found no records, the deposit token service provider 102 tries to get the account information to deposit the funds. In some embodiments, the deposit token service provider 102 could ask other deposit service providers (or other institutions) if they can find the payee in their databases, and retrieve either a d-token from that provider or retrieve the deposit account information.

If the payee still cannot be found in any available databases, the payee is asked for instructions on where to place the payment 304. The payee could be asked in an email message if the payee information includes an email. Or the payee could be asked in a text message or a phone call if the payee information contains a phone number. With a device identifier such as a MAC address or an IP address, a snipet of code could be sent to the device requesting the payment instructions. If the payee information has a physical address, a letter could be sent to that address requesting payment information. If the payee cannot be contacted or does not respond to the request for information within a fixed time period, perhaps a week or so, the request will fail, and an error message is sent 215 back to the deposit token service provider 102. If the payee responds, the payment instructions are validated and stored in the database along with the payee information. The location of the record is then included in the search results.

Then, the search results are converted into a d-token 305. In its simplest form, this d-token is a record index in the database. However, other embodiments will include an identifier specifying the deposit token service provider 102 along with a field specifying this token as a deposit token. In some embodiments, this index-identifier pair is encrypted or processed through an algorithm to mask the underlying information. In some embodiments, the d-token may have several parity bits or a checksum (or similar algorithm) to assure that the d-token has not been modified.

Finally, the d-token (or a set of d-tokens) is returned to the requesting party 306. If the d-token is not found, an indication may be returned that no d-token is yet available. The calling routine is then responsible for checking again in a few days. In other embodiments, a valid d-token is returned to a record that has the deposit instructions yet to be filled in, perhaps with an indication that the d-token is not yet valid. In still other embodiments, the d-token is returned with a future signal to the calling routine when the information is available. In still another embodiment, the receive request is sent with a parameter that is a subroutine to call once the data is found, and when the payment information is received, the subroutine is called to put the data in the proper place and perhaps to effectuate the funds transfer.

Figure 4:
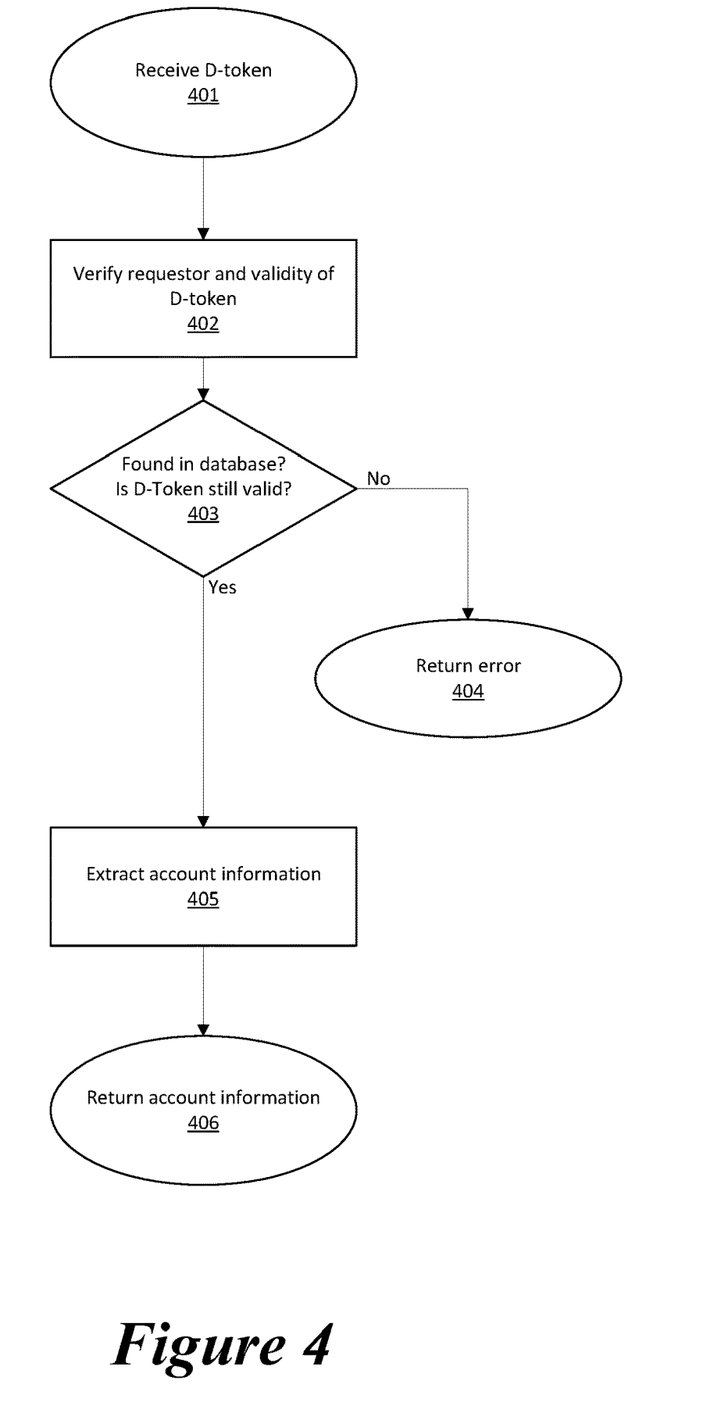
FIG. 4 is a flow chart of the conversion of a d-token into account information.

Looking to FIG. 4, the flow chart of the conversion of the d-token into specific banking instructions is seen. The d-token to look up is provided 401. The only parameter is the d-token.

The source of the request may be validated 402 in some embodiments to assure that only a qualified financial institution 105 makes this request over a banking rail 114. In addition, the d-token itself is validated to see if it is valid, checking any checksum or parity bits to assure that the d-token has not been modified. The d-token and its associated data is then decrypted and disassembled to make sure it applies to this deposit token service provider 102, and if not, the d-token may be forwarded to the proper deposit service provider. If the d-token is at the proper deposit token service provider 102, then the d-token is examined to see that it has not expired due to delay or due to use more than the assigned use, for limited use d-tokens.

Next, the d-token record index is checked to see if it is found in the database and that the d-token is still valid 403. If not, an error is returned 404 to the calling institution.

If the d-token is found and valid, then the payment instructions are extracted from the database 405. The payment instructions may include a financial institution account number (bank routing and account numbers), a credit or debit card number, a loan number, a mortgage number, a billing account number, PayPal account number, etc.

The payment instructions are then returned 406 to the calling institution. In some embodiments, this information is encrypted before transmission.

Figure 5:
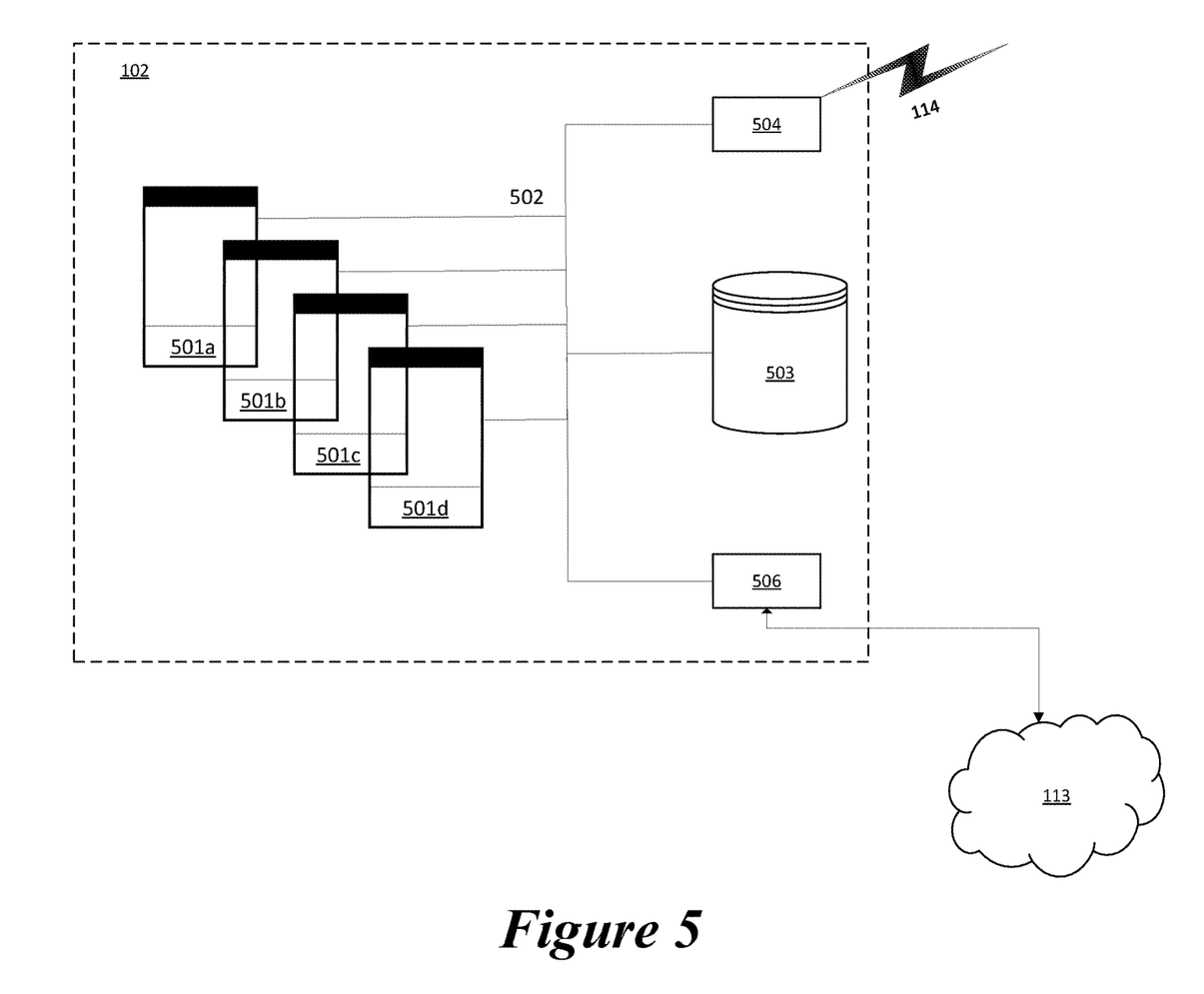
FIG. 5 illustrates an electrical diagram of a special purpose deposit token service computing device.

FIG. 5 shows a hardware diagram of the deposit token service provider 102. Since this device is required to handle a large volume of transactions with near real-time performance, a typical computer is not sufficient to perform the tasks. A processing device with a plurality of cores 501a-d electrically or optically connected to a bus 502 is used to handle the performance requirements. A high speed data storage device 503, a datastore, with solid state, optical or magnetic media, is electrically or optically connected to the bus 502. The bus may be an electrical or optical bus, configured either serially or in parallel. The bus is also connected to a rail interface 504 for connection to the banking rail 114 and to a network interface 506, the network interface 506 interfacing to the internet 113. The network and rail interfaces 504, 506 are high performance interfaces and could be combined into a single network interface in some embodiments.

The foregoing devices and operations, including their implementation, will be familiar to, and understood by, those having ordinary skill in the art.

The above description of the embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

The invention claimed is:

1. An apparatus for processing electronic deposit information, the apparatus comprising:
   a datastore containing a database of records containing a phone number and payment instructions, each record labeled with one or more tokens, where each of the one or more tokens point to a specific record, wherein the payment instructions include a bank routing and account number pair;
   a plurality of processing cores electrically connected to the datastore; and
   one or more network interfaces, electrically connected to the plurality of processing cores and to a banking rail and to an internet;
   wherein the plurality of processing cores are programmed to accept a deposit request containing payee information regarding a payee over the internet, search the datastore for a matching record with the phone number associated with the payee information, and return the token associated with the matching record to the internet as a d-token for processing an electronic deposit, wherein:
   the d-token is created from a financial institution;
   the financial institution is associated with the payee;
   the d-token is based on the matching record associated with the payee information;
   the payee information matches the phone number in the matching record; and
   the d-token indicates the matching record;
   wherein the plurality of processing cores are programmed to accept the d-token from the banking rail, validate that the d-token has not been modified, use the d-token to select the matching record associated with the d-token, and return the payment instructions in the matching record associated with the d-token to the banking rail in real-time.

2. An apparatus for processing electronic deposit information, the apparatus comprising:
a datastore containing a database of records comprising an email address and payment instructions, each record labeled with one or more tokens, where each of the one or more tokens point to a specific record, wherein the payment instructions include a bank routing and account number pair;
a plurality of processing cores electrically connected to the datastore; and
one or more network interfaces, electrically connected to the plurality of processing cores and to a banking rail and to an internet;
wherein the plurality of processing cores are programmed to accept a deposit request containing payee information regarding a payee over the internet, search the datastore for a matching record with the email address associated with the payee information, and return the token associated with the matching record to the internet as a d-token for processing an electronic deposit, wherein:
the d-token is created from a financial institution;
the financial institution is associated with the payee;
the d-token is based on the matching record associated with the payee information;
the payee information matches the email address in the matching record; and
the d-token indicates the matching record;
wherein the plurality of processing cores are programmed to accept the d-token from the banking rail, validate that the d-token has not been modified, use the d-token to select the matching record associated with the d-token, and return the payment instructions in the matching record associated with the d-token to the banking rail in real-time.

3. The apparatus for processing the electronic deposit information of claim 1 wherein the d-token contains both an identifier for the apparatus for processing the electronic deposit information and a number associated with the record.

4. The apparatus for processing the electronic deposit information of claim 3 wherein the d-token is encrypted.

5. An improved method for electronically depositing payments, the improved method comprising:
receiving payee information regarding a payee from a payment service over a network through a network interface for electronically depositing a payment;
searching a database of records, the database stored in a datastore, the records comprising a phone number and payment instructions, using a plurality of processing cores electrically connected to the datastore and the network interface, wherein the payment instructions include a bank routing and account number pair;
creating a d-token for a matching record wherein:
the d-token is created from a financial institution;
the financial institution is associated with the payee;
the d-token is based on the matching record associated with the payee information;
the payee information matches the phone number in the matching record; and
the d-token indicates the matching record;
returning the d-token to the payment service over the network using the network interface;

receiving the d-token from the financial institution over a banking rail through a rail interface;
validating that the d-token has not been modified using the plurality of processing cores;
locating the matching record using the d-token in the datastore using the plurality of processing cores;
extracting the payment instructions from the matching record in the datastore; and
returning the payment instructions to the financial institution over the banking rail through the rail interface in real-time.

6. The improved method for electronically depositing the payments of claim 5 wherein the validating further includes comparing a time difference between a d-token creation time and a d-token use time with a predetermined value.

7. The improved method for electronically depositing the payments of claim 5 wherein the validating further includes comparing a number of times the d-token has been used with a predetermined value.

8. The improved method for electronically depositing the payments of claim 5 wherein the creating of the d-token includes encrypting the phone number in the d-token.

9. The improved method for electronically depositing the payments of claim 5 further comprising encrypting the payment instructions.

10. An improved system for processing electronic deposits comprising:
a payment server computing device;
a deposit information vault; and
a financial institution computing resources;
where the payment server computing device is connected to a network, wherein the payment server computing device is programmed to send payee information regarding a payee to the deposit information vault to retrieve a d-token, wherein the payment server computing device is programmed to send the d-token to a financial institution to effectuate a payment for processing an electronic deposit;
where the deposit information vault comprises:
a datastore containing a database of records containing payment instructions and user identifiable information, where the user identifiable information is a phone number or an email address, each record labeled with one or more tokens, where each of the one or more tokens point to a specific record, wherein the payment instructions include a bank routing and account number pair;
a plurality of processing cores electrically connected to the datastore;
one or more network interfaces, electrically connected to the plurality of processing cores, to a banking rail, and to an internet;
wherein the plurality of processing cores are programmed to accept a deposit request containing the payee information over the internet, search the datastore for a matching record associated with the payee information, and return the token associated with the matching record to the internet as the d-token, wherein:
the d-token is created from the financial institution;
the financial institution is associated with the payee;
the d-token is based on the matching record associated with the payee information;
the payee information matches the phone number or email address in the matching record; and
the d-token indicates the matching record;
wherein the plurality of processing cores are programmed to accept the d-token from the banking rail, validate that the d-token has not been modified, use the d-token to select the matching record associated with the d-token, and return the payment instructions in the matching record associated with the d-token to the banking rail; and where the financial institution computing resources are programmed to accept the d-token from the payment server computing device, send the d-token over the banking rail to the deposit information vault, and accept the payment instructions from the deposit information vault, then use the payment instructions to transfer funds using the payment instructions in real-time.

11. The improved system for processing the electronic deposits of claim 10 wherein the payment server computing device runs a software program to process a mobile payment.

12. The improved system for processing the electronic deposits of claim 10 wherein the financial institution is a bank.

13. The improved system for processing the electronic deposits of claim 10 wherein the financial institution is a credit card processor.

14. The improved system for processing the electronic deposits of claim 10 wherein the payment instructions include a financial institution account number.

15. An improved method for electronically depositing payments, the improved method comprising:
receiving payee information regarding a payee from a payment service over a network through a network interface for electronically depositing a payment;
searching a database of records, the database stored in a datastore, the records comprising an email address and payment instructions, using a plurality of processing cores electrically connected to the datastore and the network interface, wherein the payment instructions include a bank routing and account number pair;
creating a d-token for a matching record wherein:
the d-token is created from a financial institution;
the financial institution is associated with the payee;
the d-token is based on the matching record associated with the payee information;
the payee information matches the email address in the matching record; and
the d-token indicates the matching record;
returning the d-token to the payment service over the network using the network interface;
receiving the d-token from the financial institution over a banking rail through a rail interface;
validating that the d-token has not been modified using the plurality of processing cores;
locating the matching record using the d-token in the datastore using the plurality of processing cores;
extracting the payment instructions from the matching record in the datastore; and
returning the payment instructions to the financial institution over the banking rail through the rail interface in real-time.

* * * * *